United States Patent
Truax et al.

(10) Patent No.: US 8,402,738 B2
(45) Date of Patent: Mar. 26, 2013

(54) FLOW CONTROL REDISTRIBUTION TO MITIGATE HIGH CYCLE FATIGUE

(75) Inventors: Philip P. Truax, Benbrook, TX (US); Daniel N. Miller, Bainbridge Island, WA (US); Edward C. Ma, Houston, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 936 days.

(21) Appl. No.: 12/497,225

(22) Filed: Jul. 2, 2009

(65) Prior Publication Data

US 2010/0003129 A1    Jan. 7, 2010

Related U.S. Application Data

(62) Division of application No. 11/418,336, filed on May 4, 2006, now Pat. No. 7,617,670.

(60) Provisional application No. 60/744,109, filed on Mar. 31, 2006.

(51) Int. Cl.
*B63H 11/00* (2006.01)

(52) U.S. Cl. .......................... 60/204; 60/269

(58) Field of Classification Search ............... 60/204, 60/269; 137/15.1, 15.2; 415/914; 244/53 B; 138/39

See application file for complete search history.

(56) References Cited

U.S. PATENT DOCUMENTS

| | | | | |
|---|---|---|---|---|
| 5,447,283 A | * | 9/1995 | Tindell | 244/207 |
| 5,721,402 A | * | 2/1998 | Parente | 181/214 |
| 6,055,805 A | * | 5/2000 | El-Aini et al. | 60/226.1 |
| 6,112,513 A | * | 9/2000 | Catt et al. | 60/204 |
| 6,655,632 B1 | * | 12/2003 | Gupta et al. | 244/53 B |

* cited by examiner

*Primary Examiner* — Phutthiwat Wongwian
(74) *Attorney, Agent, or Firm* — Bracewell & Giuliani LLP

(57) ABSTRACT

A method operable to improve pressure recovery and/or distortion within engine inlet is disclosed. A first fluid flow is provided to primary jet vortex generator(s) operable to inject fluid at a first injection rate into a boundary layer of a primary fluid flow within the inlet. A secondary fluid flow is injected by secondary jet vortex generator(s) at a second injection rate into the boundary layer of the primary fluid flow. The fluid injected at the first injection rate and second injection rate is operable to induce secondary flow structures within the boundary layer. These secondary close structures are then operable to improve or manipulate the pressure recovery of the inlet. At specific engine conditions, this method may redistribute the ratio of the first injection rate and second injection rate in order to improve pressure recovery and/or distortion of the inlet when the particular engine conditions.

14 Claims, 9 Drawing Sheets mems sheer sensor mems pressure sensor mems velocity sensor

FLOW CONTROL REDISTRIBUTION TO MITIGATE HIGH CYCLE FATIGUE

CROSS-REFERENCE TO RELATED APPLICATION

This application is a divisional of application Ser. No. 11/418,336, filed May 4, 2006 now U.S. Pat. No. 7,617,670.

This application incorporates by reference and claims priority under 35 USC § 119(e) to a provisionally filed patent application entitled "FLOW CONTROL REDISTRIBUTION TO MITIGATE HIGH CYCLE FATIGUE," and having a filing date of Mar. 31, 2006, and an application No. 60/744,109.

TECHNICAL FIELD OF THE INVENTION

The present invention relates generally to manipulation of fluid flow and more particularly, a system and method for manipulating fluid flow within an engine inlet duct to mitigate the level of vibration of engine compression system components.

BACKGROUND OF THE INVENTION

Most modern aircraft are powered by gas turbine engines, also known as jet engines. There are several types of jet engines, but all jet engine propulsion systems have certain parts in common. For example, all jet engine propulsion systems have an inlet with which to bring in free stream air into the engine. The inlet sits upstream of the compressor and, while the inlet does no work on the flow, there are important design features associated with the inlet. The total pressure through the inlet changes because of several flow effects. The inlet pressure performance is often characterized by the inlet pressure recovery, which measures the amount of free stream flow conditions that are recovered. This pressure recovery depends on a wide variety of factors, including inlet shape, aircraft speed, air flow demand of the engine, and aircraft maneuvers. The above effects are not uniform over the face of the engine.

Flow field vortices generated by fluid flow over aerodynamic surfaces within the inlet can cause buffet and fatigue any downstream structure exposed to these vortices and reduce engine performance. Vortices can be generated at the fore body of an aircraft or other upstream structure, and damage control surfaces, engines, after body/empennage, nacelles, turrets, or other structures integrated into the airframe. Additionally, these vortices can be ingested within engine air intakes or other like air inlets leading to poor performance, excessive blade vibration, and/or stalling of the aircraft engines. Stalling the aircraft engine and/or excessive blade vibration create a potentially hazardous conditions.

Next generation aircraft, such as blended wing body, compound this problem by incorporating gas turbine inlets with serpentine flow paths within the air frame. Additionally, exotic aperture shapes for the inlet and outlet may cause excessive propulsion performance losses. These losses emanate from strong secondary flow gradients in the near wall boundary of the airflow, which produce coherent large-scale vortices.

Compressor face distortion can lead to high amplitude circumferential harmonics at critical engine speeds causing excessive vibration of fan or compressor blades, leading to blade failure due to high cycle fatigue. In the past, such problems have been solved by redesign of the inlet duct or redesign of the fan or compressor blades by adding dampening or increasing blade strength to change the natural frequency. Any of these changes may involve increased cost and weight associated with the aircraft.

Another solution employs passive vortex generator vanes to mitigate the effects of flow field vortices. However, these vanes result in increased weight and reduced performance over the entire operating envelope of a vehicle. Vortex generators are small wing like sections mounted on an aerodynamic surface exposed to the fluid flow and inclined at an angle to the fluid flow to shed the vortices. The height chosen for the best interaction between the boundary layer and the vortex generator is usually the boundary layer thickness. The principle of boundary layer control by vortex generation relies on induced mixing between the primary fluid flow and the secondary fluid flow. The mixing is promoted by vortices trailing longitudinally near the edge of the boundary layer. Fluid particles with high momentum in the stream direction are swept along helical paths toward the duct surface to mix with and, to some extent replace low momentum boundary layer flow. This is a continuous process that provides a source to counter the natural growth of the boundary layer creating adverse pressure gradients and low energy secondary flow accumulation.

The use of vortex generators to reduce distortion and improve total pressure recovery has been applied routinely. Small-geometry surface configurations affect turbulent flow at the boundary layers.

Pressure recovery and distortion at the engine face within the inlet depend on a wide variety of factors, including the shape of the inlet, speed of the aircraft, air flow demands, and aircraft maneuvers. Since a variety of factors effect pressure recovery and distortion of the inlet, the airflow may not best served by a passive flow control. Solutions such as passive vortex generators, which reduce distortion and improve total pressure recovery, are optimized for certain operating conditions of the aircraft. As the aircraft may maneuver and engine air flow requirements may change, a single solution is not best suited to improve the pressure recovery and distortion of the engine inlet over the operating envelope of the aircraft.

SUMMARY OF THE INVENTION

The present invention provides a system and method to improve pressure recovery and distortion of an engine inlet that substantially addresses the above-identified needs. This method involves providing a first fluid flow to primary jet vortex generators operable to inject fluid at a first injection rate into a boundary layer of a primary fluid flow within the inlet. A secondary fluid flow is injected by secondary jet vortex generators at a second injection rate into the boundary layer of the primary fluid flow. Fluid injected at the first injection rate and second injection rate are operable to induce secondary flow structures within the boundary layer. These secondary close structures are operable to improve pressure recovery and distortion of the inlet. At specific engine conditions, this method redistributes the ratio of the first injection rate and second injection rate in order to change the distortion pattern of the inlet when particular engine conditions exist. Such particular engine conditions may include a natural blade frequency of the engine at a particular speed. This allows blade vibration problems associated with the engine with engine operation at particular speeds to be addressed without adding damping or increasing blade strength to change the natural frequency of the blades. This avoids additional weight and improves engine performance.

Another embodiment in the present invention provides an inlet control system that may change the distortion pattern within a flow inlet. This inlet flow control system includes a first manifold, primary jet vortex generator(s), a second manifold, secondary jet vortex generator(s), and a control system. The first manifold and second manifold supply fluid flow to the primary jet vortex generator(s) and secondary jet vortex generator(s), respectively. The jet vortex generator(s) may be located on duct surfaces within the flow inlet. The jet vortex generators inject fluid received from the pressure manifolds at adjustable injection rate(s) into the boundary layer of the ducted primary fluid flow within the flow inlet. The primary and secondary jet vortex generators induce secondary flow structures within the boundary layer that manipulate the flow within the flow inlet in order to change the distortion pattern of the inlet. As many variables may affect the distortion pattern of the flow inlet, an active control system may redistribute the ratio of the fluid injected by the primary vortex generator(s) and the secondary vortex generator(s) in order to achieve an improved distortion pattern of the flow inlet.

Additional embodiments may include sensors that sense engine conditions such as a specific speed corresponding to a blade frequency. In other embodiments, sensors may sense the circumferential distortion across a compressor face of an engine coupled to the flow inlet. By comparing engine conditions or circumferential distortion to predetermined or desired values, the fluid injected by the vortex jet generators may be redistributed when the circumferential distortion across the compressor face compares unfavorably to a desired circumferential distortion or when the engine is operating at a particular harmonic or speed associated with a blade number. In either case, this allows the weight and cost associated with the engine to be reduced as blades may not require extra hardening in order to operate the engine at the predetermined blade frequencies.

BRIEF DESCRIPTION OF THE DRAWINGS

For a more complete understanding of the present invention and the advantages thereof, reference is now made to the following description taken in conjunction with the accompanying drawings in which like reference numerals indicate like features and wherein.

DETAILED DESCRIPTION OF THE INVENTION

Preferred embodiments of the present invention are illustrated in the figures like numerals being used to refer to like and corresponding parts of the various drawings.

The present invention provides a system and method for manipulating fluid flow within an inlet that substantially eliminates or reduces disadvantages and problems associated with previously developed systems and methods. More specifically, the present invention provides a system and method to improve pressure recovery and distortion within a flow inlet and reduce buffeting or fatigue to engine components through the use of jet vortex generators. This system and method includes the placement of jet vortex generators on surfaces bounding the fluid flow. These jet vortex generators manipulate the flow behavior at this boundary of the fluid flow, to reduce flow separation within the primary fluid flow and improve pressure recovery and distortion.

Figure 1:
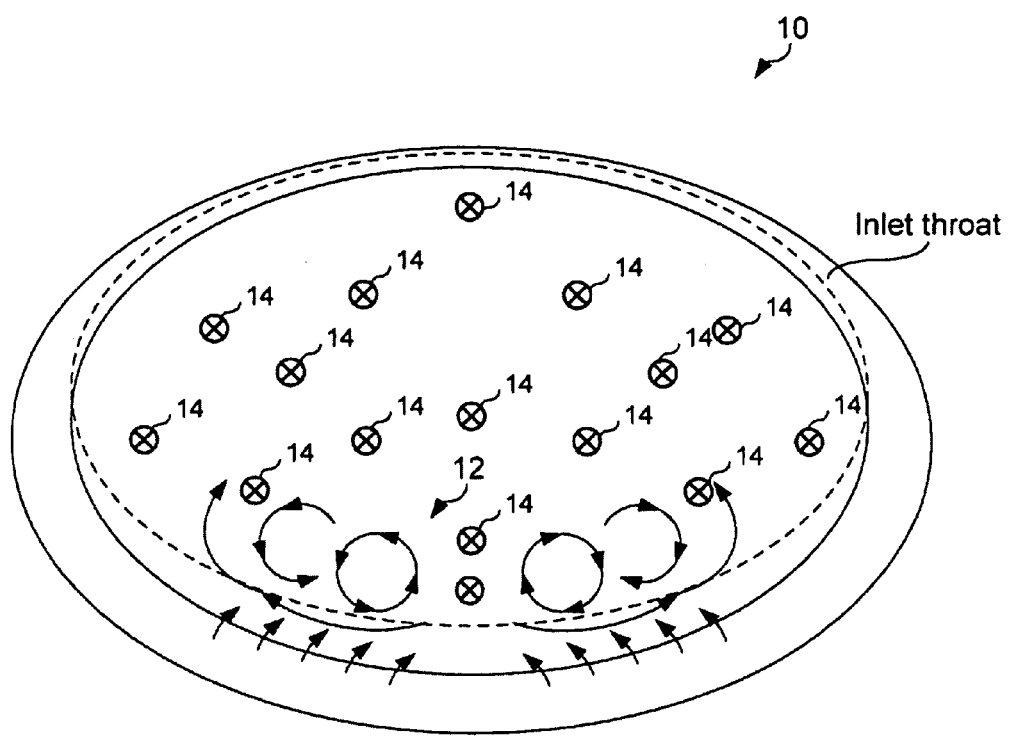
FIG. 1 depicts flow distortions within a flow inlet that are addressed by embodiments of the present invention.

FIG. 1 provides a three dimensional flow field within a duct or flow inlet 10. Within inlet 10, vortex formation is indicated within the inlet by lines 12. This vortex formation may begin as primary fluid flow enters the flow inlet and may continue to grow and cause the flow field distortion as the primary fluid flow 14 reaches the compressor face of an engine coupled to the flow inlet.

Figure 2:
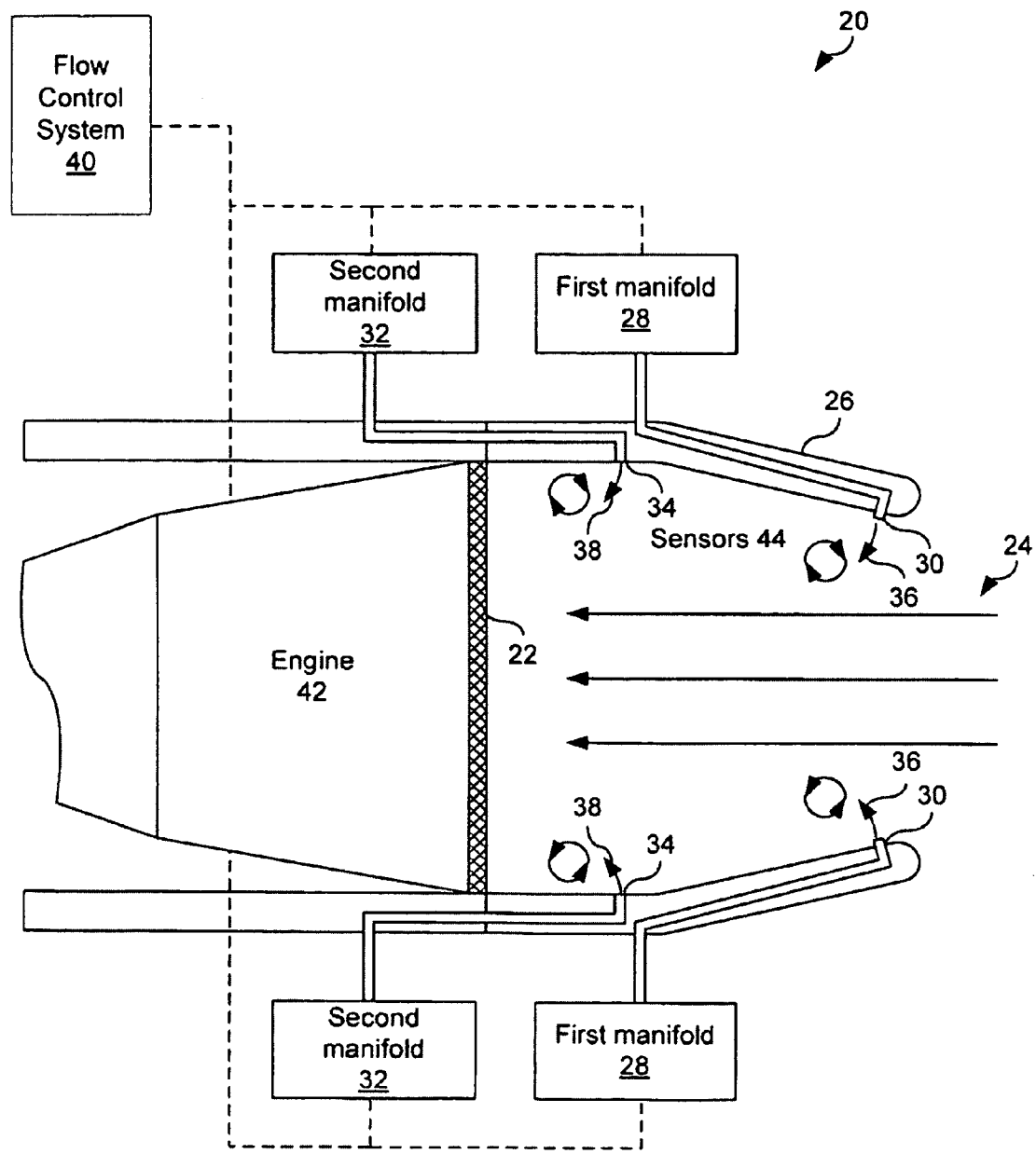
FIG. 2 depicts a flow inlet that employs a flow control system in accordance with an embodiment of the present invention.

FIG. 2 depicts an embodiment of the present invention of a flow inlet 20 operable to provide improved pressure recovery and distortion across compressor face 22. This involves receiving a primary flow 24 within a ducted flow inlet 26. This flow inlet includes flow inlet 26, primary jet vortex generator(s) 30 and secondary jet vortex generator(s) 34. Jet vortex generators 30 and 34 couple to manifolds 28 and 32, respectively. These manifolds provide fluid which the vortex generators may then inject into a boundary layer of primary fluid flow 24 within flow inlet 26. Primary jet vortex generator(s) 30 inject fluid at a first injection rate while secondary jet vortex generator(s) 34 inject fluid 38 at a second injection rate. Inlet flow control system 40 may adjust the injection of fluid by the primary jet vortex generator 30 and secondary jet vortex generator 34 by adjusting manifold pressure within first manifold 28 and second manifold 32, respectively. By adjusting these injection rates, it is possible to improve pressure recovery and distortion seen by compressor face 22 of engine 42 coupled to the flow inlet. Changing the ratio of fluid injection from the primary jet vortex generators to the secondary jet vortex generator(s) allows favorable change in the circumferential distortion to be realized without significantly reducing pressure recovery or increasing spatial distortion.

Embodiments of the present invention may change the level of forward versus aft injection rates of jet vortex generators to achieve positive improvements in pressure recovery and distortion. Similar results may also be accomplished by changing the strength of fluid injected by primary and secondary jet vortex generators that are laterally separated as opposed to fore and aft separation within the fluid flow.

Primary and secondary jet vortex generators inject fluid and as such, provide an active flow control technique. The fluid injected by these vortex generators may be redirected or eliminated when not required for flow control. This is especially desirable when compared to prior solutions that employed passive strategies successful in one condition but could increase a blade's vibration at other conditions. Active vortex jet generators provide the ability to adjust or shut off fluid flow. In so doing, the use of jet vortex generators may reduce or eliminate the risk of negative effects associated with passive solutions. Additionally, because active solutions are not always required, it is not necessary to bleed air from an engine compressor when not required to adjust the pressure recovery and/or distortion of the engine inlet.

Figure 3:
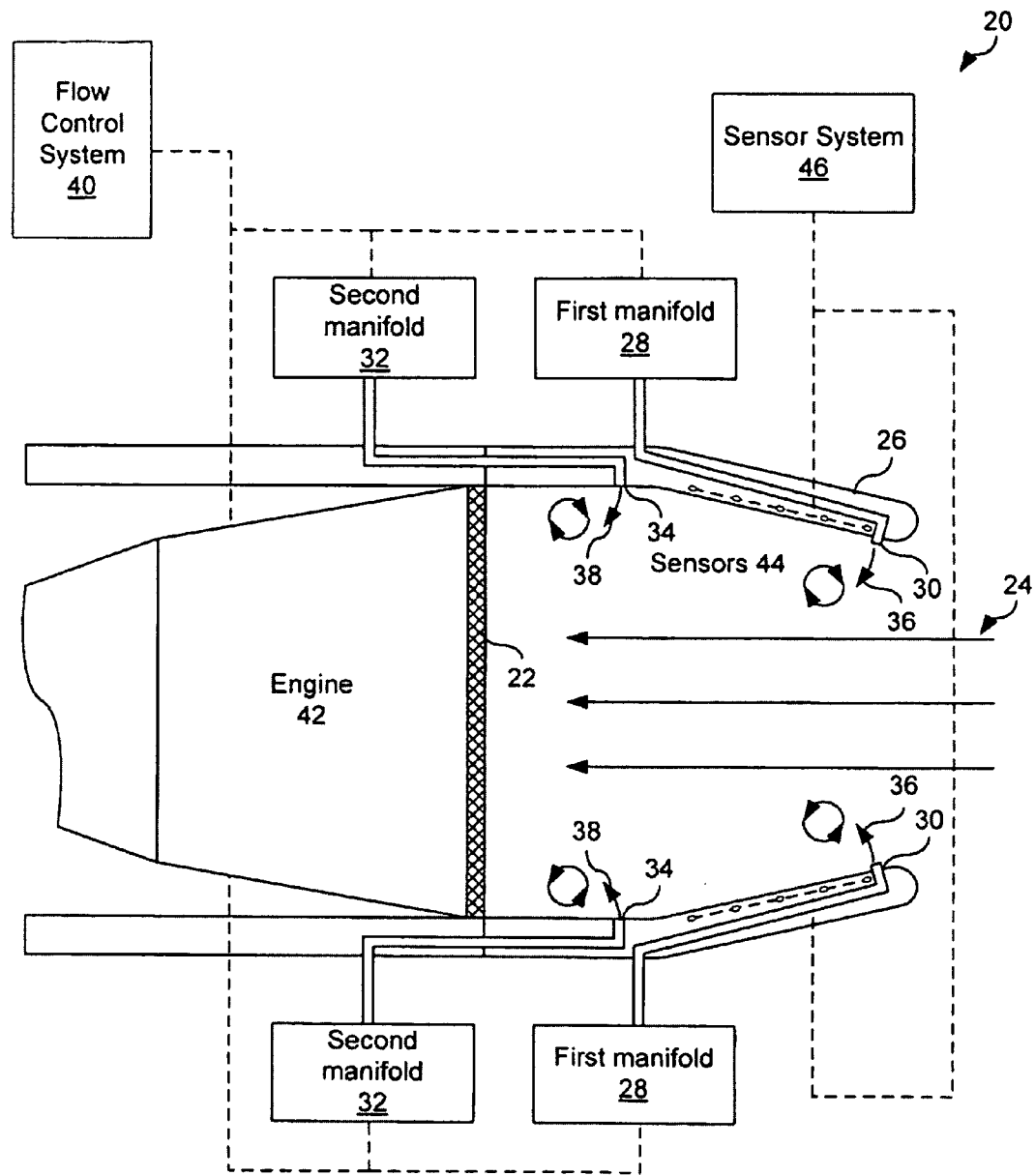
FIG. 3 depicts a flow inlet that employs a flow control system in accordance with a second embodiment of the present invention.

Inlet flow control system 40 may redistribute a ratio of the first injection rate and second injection rate to improve pressure recovery and/or distortion to compressor face 22 of engine 42 coupled to engine inlet 20. This flow control system may contain sensors 44 as shown in FIG. 3, wherein the sensors are operable to sense engine conditions such as engine speed so that when the engine is operating at a predetermined frequency associated with the blade natural frequency, the inlet flow control system may redistribute injected fluid in order to improve pressure recovery and/or distortion when that engine condition exists. When a particular engine condition is not in existence it may not be necessary to redistribute flow injected by the primary and secondary jet vortex generators. This redistribution of the injected fluid can mitigate blade vibration in jet engine 42 allowing the weight of the engine to be reduced as hardening of these blades is not required. In another embodiment the flow control system instead of sensing a specific engine condition may sense the actual pressure recovery or circumferential distortion across the engine inlet and then compare the sensed conditions with desired conditions and redistribute flow to improve pressure recovery and/or distortion when the sensed conditions compare unfavorably to the desired conditions.

Figure 4:
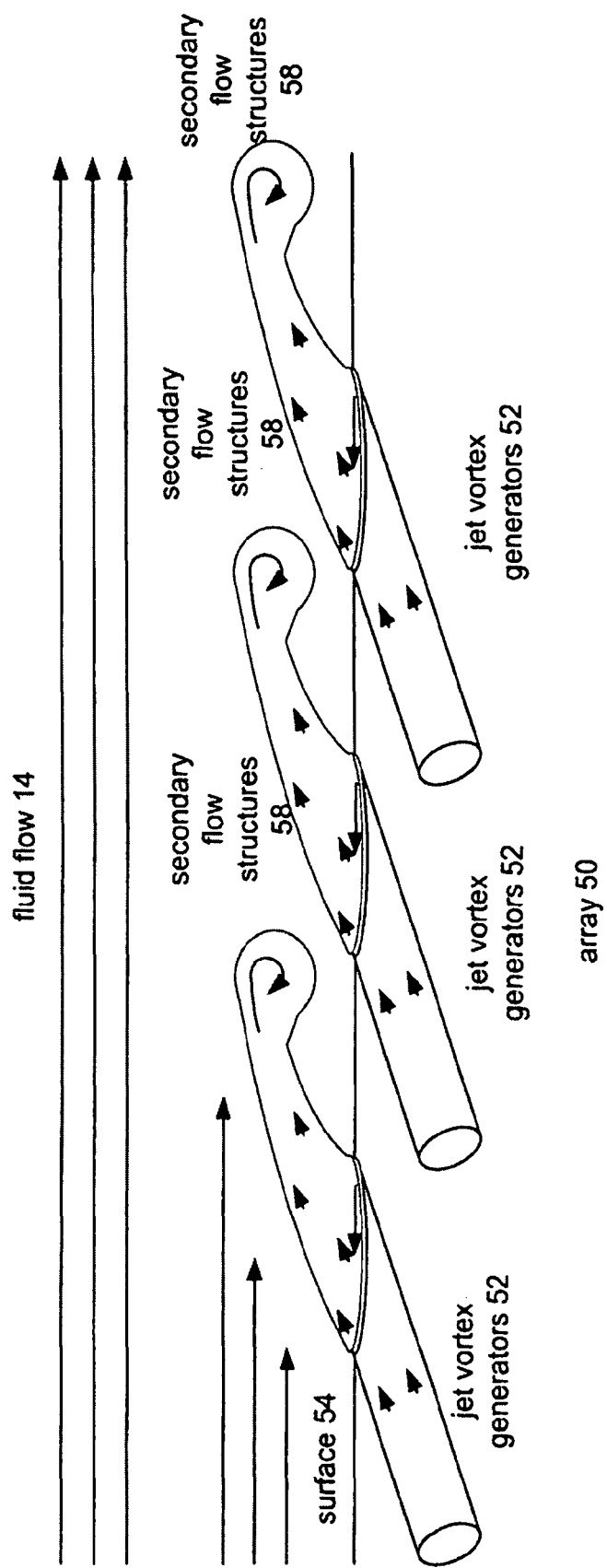
FIG. 4 provides a cross-section view of a micro-jet embedded within an aerodynamic surface in accordance with the present invention.

FIG. 4 depicts an array 50 of jet vortex generators 52. Jet vortex generators 52 are embedded in surface 54 over which primary fluid flow 24 flows. The jet vortex generators 52 introduce a fluid flow that causes secondary flow structures 58 to form in the near wall boundary layer between primary fluid flow 24 and aerodynamic surface 54. Thus, jet vortex generators 52 introduce secondary flow structures 58 that influence the pressure recovery and distortion of flow inlet 20.

One potential implementation applies this flow control system arrays to the engine inlet of a vehicle, such as but not limited to aircraft. Other aerodynamic vehicles such as automobiles, trucks, trains, and boats that are sensitive to aerodynamic constraints may employ this flow control system to address aerodynamic concerns and improve the aerodynamic performance of flow inlets for turbine engines within these vehicles.

Figure 5A:
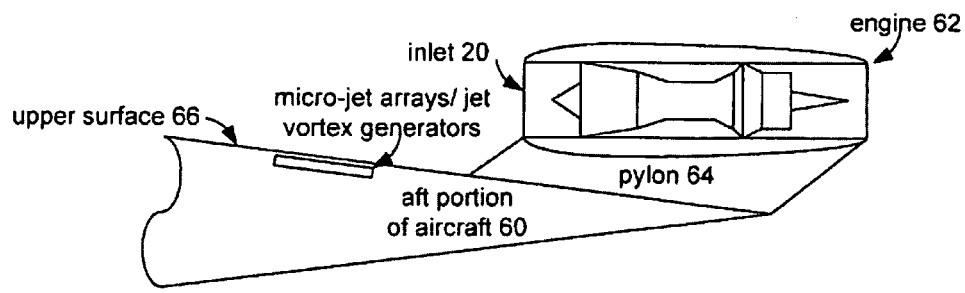
FIGS. 5A, 5B and 5C depict a cross section of a next generation aircraft, such as a blended wing body, having micro-jet arrays operable to minimize the impact of boundary layers on engines located near or submerged within the upper surface of the airframe.
Figure 5B:
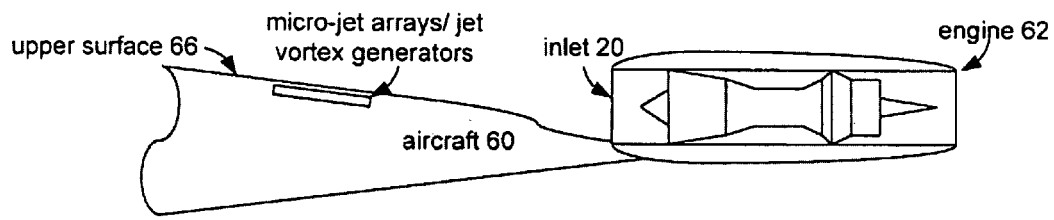
Figure 5C:
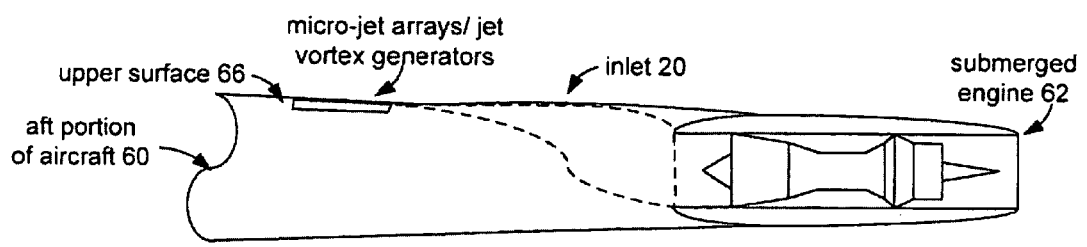

FIGS. 5A, 5B, and 5C depict a cross-section of a next-generation aircraft such as the blended wing body (BWB) where the engine inlets are placed near the upper surface or submerged within the upper surface of a vehicle such as an aircraft. Here aircraft 60 has the engine 62 located near the aft portion of the aircraft. FIG. 5A depicts engine 62 being mounted on a pylon 64 but located near the upper surface 66 of aircraft 60. Mounting above but near the upper surface avoids some problems associated with ingesting boundary layer flow (low energy boundary layer air) at or near upper surface 66. FIG. 5B depicts an instance where engine 62 is mounted at the surface to eliminate the pylon or nacelle supporting engine 62. By eliminating the pylon or nacelle 68, a smaller surface area is experienced, thus reducing weight and drag of the aircraft 60. FIG. 5C depicts the instance where an engine 62 is submerged within the upper surface 66 of aircraft 60. In the cases presented in FIGS. 5B and 5C, Jet vortex generators may be used to actively control and manipulate the boundary layer as seen by inlet 70 of engine 62. These jet vortex generators may use continuous or pulsating air jets for boundary layer control. These jet vortex generators manipulate the shedding, size, and trajectory of vorticles as well as the boundary layer to improve the pressure recovery and/or distortion of the flow inlet at engine 62. Previous solutions may have merely used static vortex generators to manipulate the boundary layer and flow structures ingested by the engines. Although these engines may still experience airflow distortion, the jet vortex generators located forward of the flow inlets to engine 62 can significantly reduce distortion of the airflow ingested by these engines. This may reduce the portion of the lower energy boundary layer ingested by an engine located near the surface or submerged within the surface of the airframe. By reducing the amount of low energy boundary layer air ingested by the engine, the drag reduction experienced by ingesting the low energy boundary layer fluid may be reduced. Thus, the present invention can significantly improve the performance of a vehicle such as a next-generation aircraft like the BWB if engine inlet distortion can be controlled.

A control system, such as flow control system 40 may be operably coupled to jet vortex generators 52. This control system is operable to actively direct jet vortex generators 52 to introduce secondary flows in order to achieve a desired primary fluid flow 24 within the flow inlet.

This active control may be further complemented by the sensor system 46 of FIG. 3 operably coupled to the jet vortex generators. This sensor system 46 may employ sensors 44 located at various locations within the flow inlet. These sensors are operable to detect the characteristics of primary fluid flow 24 within the flow inlet. Sensor outputs are provided to sensor system 46 and flow control system 40. The flow control system is operable to compare the detected fluid flow characteristics with desired fluid flow characteristic. Then flow control system 40 may actively direct the jet vortex generators to introduce secondary flows that result in a desired fluid flow within the flow inlet.

Flow control system 40 may include a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions.

The jet vortex generators may be very-small-scale devices. In some embodiments theses jets are on the order of one-tenth of the boundary layer thickness. These jet vortex generators may be fabricated in many ways and applied as an appliqué to or cast into the surface. The jet vortex generators may be miniature fluidic jets that introduce momentum in the form of micro-jet flows. These micro-jet flows may be continuous or pulsed and may be bled from the primary flow associated with an engine. Jet vortex generators may also be micro fabricated mechanical structures incorporated on or in the aerodynamic surface. These may also be synthetic pulsators. Other similarly sized jets, known to those skilled in the art, may also be used as the micro-jets.

Figure 6A:
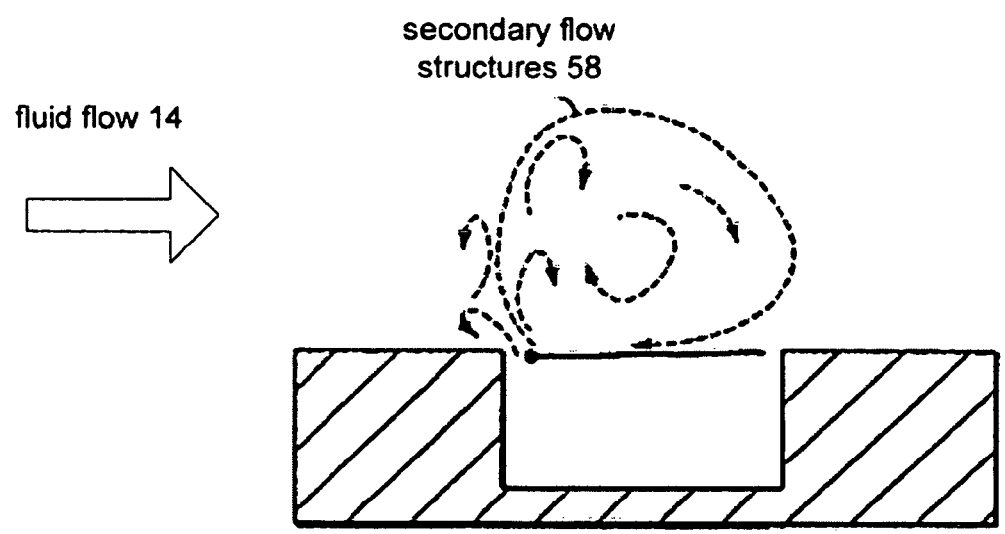
FIGS. 6A-6D depict various potential micro-jets or like devices.
Figure 6B:
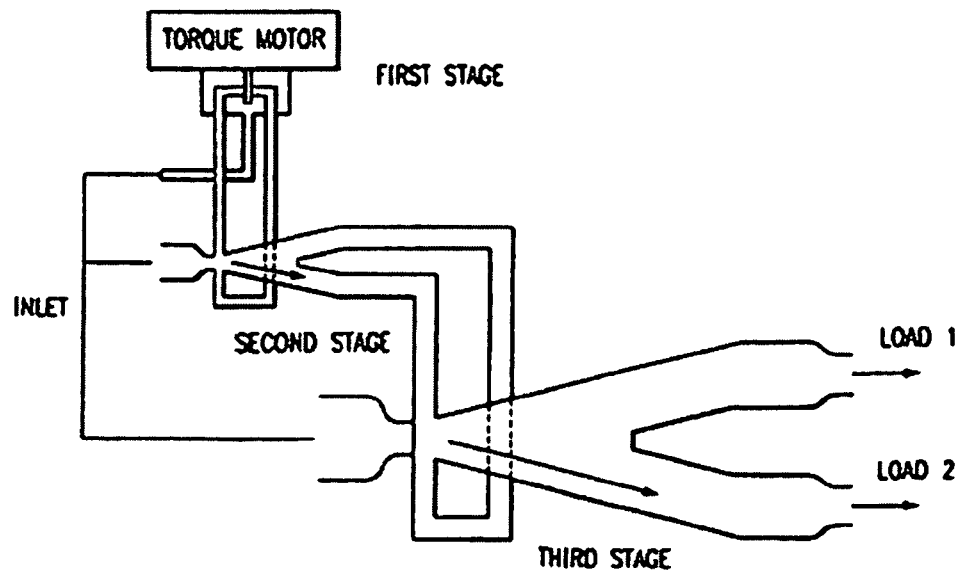

FIGS. 6A-6D illustrate many examples of micro fabricated electro-mechanical structures (MEMS) which may be used as these micro-jets. FIG. 6A depicts a fluidic effector creating secondary flows structures as primary fluid flow 24 passes over fluidic effector. FIG. 6B depicts a pulsing effector. A fluidic oscillator alternates flow between two outflow legs by injecting high pressure on either side of the nozzle orifice. Injecting at input 1 causes flow to exit the device at output 2, and injecting at input 2 causes flow to exit the device at output 1. The input flow can come from a like, but smaller device (second stage) or from a mechanically driven valve (first stage).

Figure 6C:
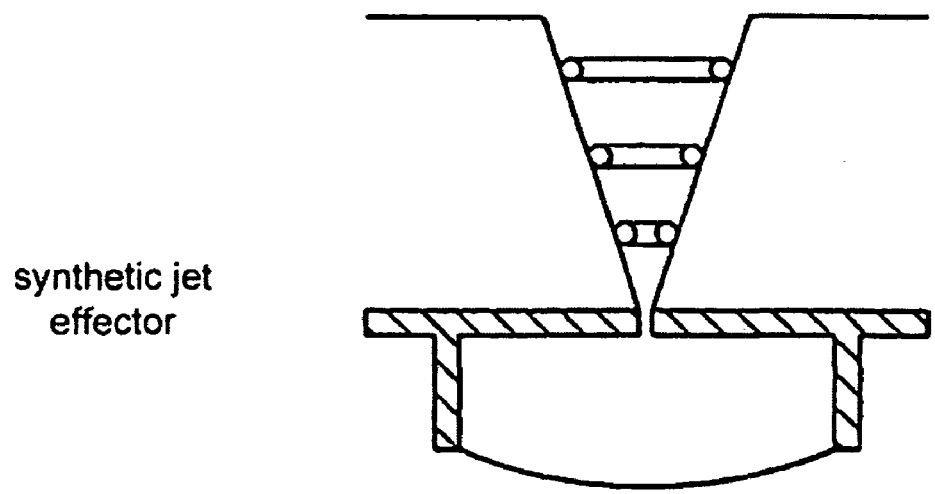
Figure 6D:
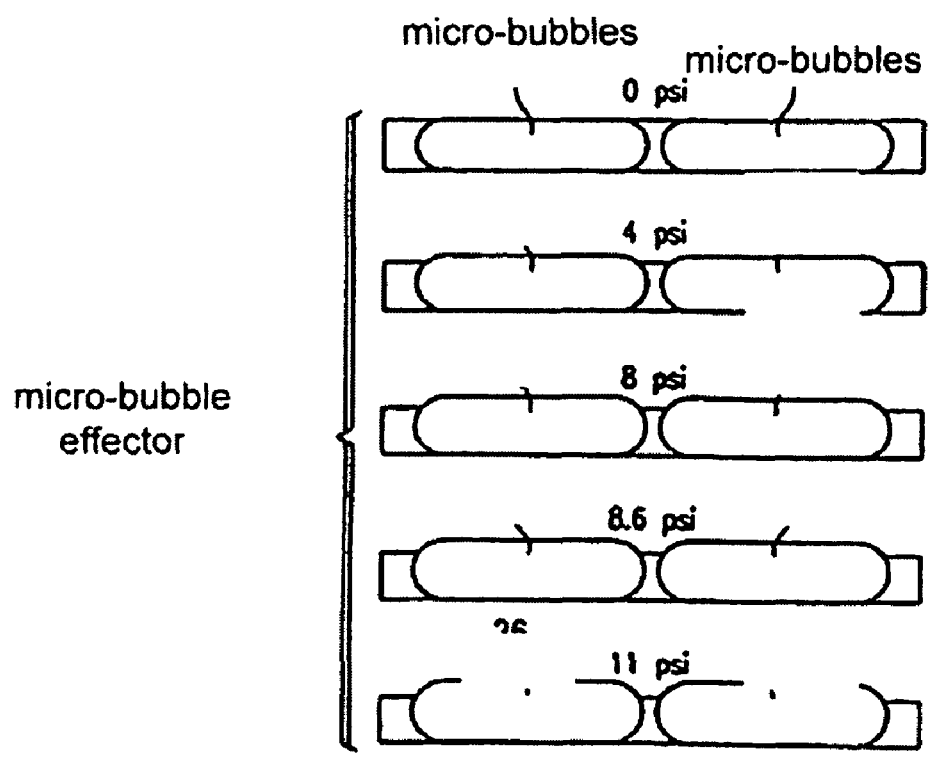

FIG. 6C depicts a synthetic jet effector. This type of effector uses a vibrating diaphragm, which bounds a cavity to generate an air jet. The oscillating surface draws fluid into the cavity from all directions and then expels it in a narrow jet. The resultant pulsed jet has no net mass flow. FIG. 10D presents a micro-bubble effector where micro-bubbles expand based on internal pressure to manipulate secondary flow structures 18. The effectors listed above are examples of possible MEMS devices, which may be used to manipulate primary fluid flow.

Figure 7A:
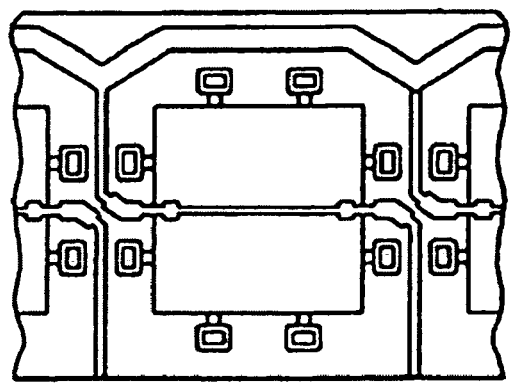
FIGS. 7A-7C depict various potential sensors.
Figure 7B:
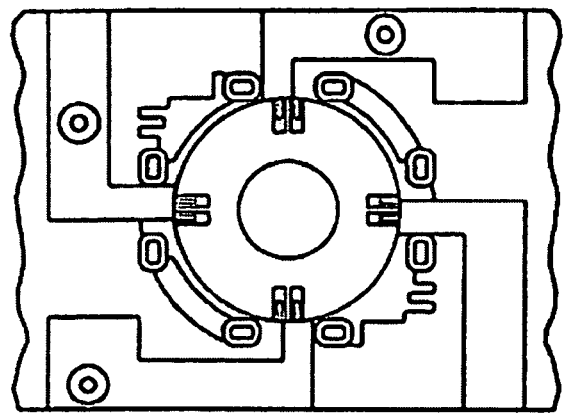
Figure 7C:
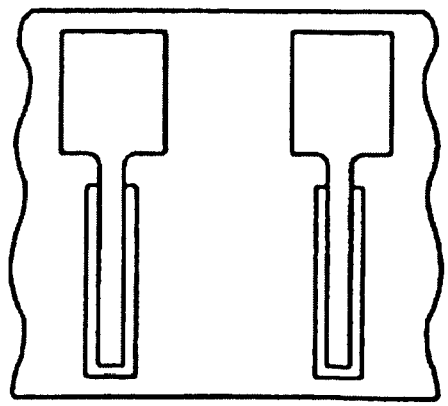

Sensor system 46 may receive input from conventional flow sensors or micro fabricated electro-mechanical sensor devices such as those illustrated in FIGS. 7A, 7B and 7C. FIG. 7A depicts sensor 44 as a MEMS sheer sensor. This device functions in a manner similar to a hot-film sheer stress sensor. A small surface flush with the duct wall is maintained at a constant temperature. The heat flex at the duct wall is then measured. This heat flux can be calibrated to sheer stress.

FIG. 7B depicts sensor 44 as a MEMS pressure sensor. FIG. 7C depicts sensor 44 as a velocity sensor. This device functions in a manner similar to hot-wire anemometers. Electric current is passed through a metal element exposed to the fluid flow. The fluid flow convectively cools the element, effecting a change in its electric resistance. This change in resistance can be related to the velocity magnitude at the sensor through calibration. These sensors may be incorporated into surfaces proximate to the fluid flow within the flow inlet.

Figure 8:
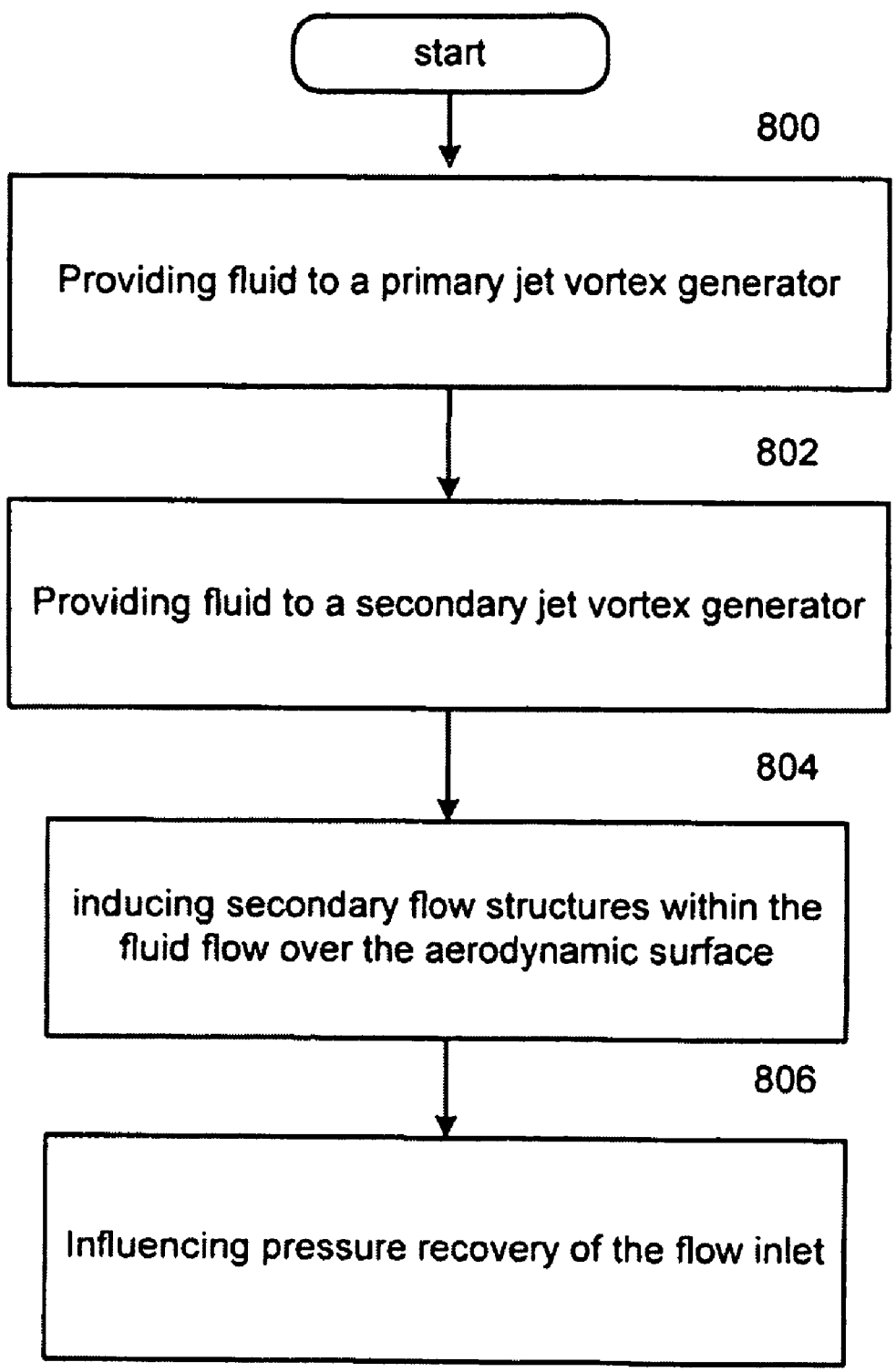
FIG. 8 provides a logic flow diagram depicting one methodology for influencing flow fields in accordance with the present invention.

FIG. 8 provides a logic flow diagram illustrating a method associated with an embodiment of the present invention operable to improve the pressure recovery and/or distortion of a flow inlet. This involves providing fluid flows to primary jet vortex generators in step 800. These primary jet vortex generators are operable to inject fluid at a first injection rate into a fluid flow within the flow inlet. In step 802, a second fluid flow is provided to secondary jet vortex generators. Secondary jet vortex generators may inject fluid at a second injection rate into the boundary layer of the primary fluid flow within the flow inlet. The fluid injected at the first and second injection rate produces structures within the boundary layer in Step 804. The ratio of the first injection rate and second injection rate may be manipulated in step 806 to improve pressure recovery and/or distortion of the flow inlet when particular engine conditions exist associated with an engine at the compressor face coupled to the flow inlet. Embodiments may manipulate this ratio when a particular engine condition is sensed, such as the engine speed associated with a natural blade frequency of the compressor. Altering the flow conditions affects the circumferential distortion within the flow inlet and may avoid or reduce the need to dampen or harden of blades within the turbine engine.

Adjusting this ratio may involve adjusting pressures associated with manifolds used to provide fluids to the jet vortex generators. By adjusting the pressure of these manifolds the injection rate may be increased or decreased based on the pressure of the manifold.

Embodiments of the present invention enable new and improved designs of aircraft or other vehicles by allowing unconventionally aerodynamic shapes. Additionally, flow control can reduce cyclic fatigue of components located within primary fluid flow 24. Stress peak amplitudes experienced by a component within the fluid flow for a normal flow can be greatly reduced by reducing or eliminating interactions between flow field vortices and structural components.

In summary, embodiments of the present invention provide a system and method operable to improve pressure recovery within engine inlet. This method involves providing a first fluid flow to primary jet vortex generator(s) operable to inject fluid at a first injection rate into a boundary layer of a primary fluid flow within the inlet. A secondary fluid flow is injected by secondary jet vortex generator(s) at a second injection rate into the boundary layer of the primary fluid flow. The fluid injected at the first injection rate and second injection rate is operable to induce secondary flow structures within the boundary layer. These secondary close structures are then operable to improve or manipulate the pressure recovery and/or distortion of the inlet. At specific engine conditions, this method may redistribute the ratio of the first injection rate and second injection rate in order to improve pressure recovery and/or distortion of the inlet when the particular engine conditions. Such engine conditions may be associated with a natural blade frequency of the engine at a particular speed. Embodiments of the invention allow blade vibration problems associated with engine operation at particular speeds to be solved without adding damping or increasing blade strength to change the natural frequency of the blades, thereby reducing weight and improving engine performance.

The present invention may be used to improve flow behavior in a hydrodynamic application. This may minimize head loss in a piping system, reduce flow noise within a piping system or over a submerged structure or to control and manipulate hydrodynamic flow about a watercraft for direction and thrust control.

As one of average skill in the art will appreciate, the term "substantially" or "approximately", as may be used herein, provides an industry-accepted tolerance to its corresponding term. Such an industry-accepted tolerance ranges from less than one percent to twenty percent and corresponds to, but is not limited to, component values, integrated circuit process variations, temperature variations, rise and fall times, and/or thermal noise. As one of average skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of average skill in the art will also appreciate, inferred coupling (i.e., where one element is coupled to another element by inference) includes direct and indirect coupling between two elements in the same manner as "operably coupled". As one of average skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

Although the present invention has been described in detail herein with reference to the illustrative embodiments, it should be understood that the description is by way of example only and is not to be construed in a limiting sense. It is to be further understood, therefore, that numerous changes in the details of the embodiments of this invention and additional embodiments of this invention will be apparent to, and may be made by, persons of ordinary skill in the art having reference to this description. It is contemplated that all such changes and additional embodiments are within the spirit and true scope of this invention as claimed below.

What is claimed is:

1. A method operable to improve pressure recovery and distortion of an inlet, comprising:
   providing a first fluid flow to at least one primary jet vortex generator, wherein the at least one primary jet vortex generator injects fluid at a first injection rate into a boundary layer of a primary fluid flow within the inlet;
   providing a second fluid flow to at least one secondary jet vortex generator wherein the at least one secondary jet vortex generator injects inject fluid at a second injection rate into the boundary layer of the primary fluid flow within the inlet, and wherein the fluid injected at the first injection rate and second injection rate are operable to induce secondary flow structure(s) within the boundary layer; and redistributing a ratio of the first injection rate and second injection rate to improve pressure recovery and distortion of the inlet when at least one particular engine condition exists;

wherein redistributing the first injection rate and second injection rate comprises adjusting a ratio of a first pressure within a first manifold and a second pressure within a second manifold, wherein the first manifold provides the first fluid flow to the at least one primary jet vortex generator and the second manifold provides the second fluid flow to the at least one secondary j et vortex generator.

2. The method of claim 1, further comprising sensing the at least one particular engine condition.

3. The method of claim 2, wherein the at least one particular engine condition comprises at least one engine speed corresponding to a blade frequency.

4. The method of claim 1, wherein the at least one primary jet vortex generator and at least one secondary jet vortex generator are positioned laterally relative to one another within the engine inlet.

5. The method of claim 1, wherein the at least one primary jet vortex generator is positioned forward of the at least one secondary jet vortex generator.

6. The method of claim 1, wherein the redistribution of the ratio of the first injection rate and second injection rate mitigate blade vibration at the at least one particular engine condition.

7. The method of claim 1, wherein the redistribution of the ratio of the first injection rate and second injection rate alters circumferential distortion across the engine inlet.

8. The method of claim 1, further comprising:
sensing, circumferential distortion across the engine inlet;
comparing the sensed circumferential distortion across the engine inlet to a desired circumferential distortion across the engine inlet; and
redistributing the ratio of the first injection rate and second injection rate when the sensed circumferential distortion across the engine inlet compares unfavorably to the desired circumferential distortion across the engine inlet.

9. The method of claim 1, further comprising:
sensing flow conditions within the primary fluid flow, with a flow sensor system; and
wherein dynamically redistributing the ratio of the first injection rate and second injection rate allows a desired pressure recovery and/or distortion of the inlet to be achieved.

10. The method of claim 1, wherein the at least one primary jet vortex generator and at least one secondary jet vortex generator comprise micro jets operable to inject momentum into a near-wall boundary region.

11. The method of claim 10, wherein the micro-jets comprise micro fabricated mechanical structures.

12. A method operable to improve pressure recovery and distortion of an inlet, comprising:
injecting fluid from at least one primary vortex generator at a first injection rate into a boundary layer of a primary fluid flow within the inlet;
injecting fluid from at least one secondary jet vortex generator at a second injection rate into the boundary layer of the primary fluid flow within the inlet, wherein the fluid injected at the first injection rate and second injection rate are operable to induce secondary flow structures within the boundary layer, and wherein the at least one primary jet vortex generator and at least one secondary jet vortex generator are positioned laterally relative to one another within the engine inlet;

redistributing a ratio of the first injection rate and second injection rate to improve pressure recovery and distortion of the inlet when at least one particular engine condition exists; and sensing the at least one particular engine condition, the particular engine condition comprising at least one engine speed corresponding to a blade frequency;

wherein redistributing the first injection rate and second injection rate comprises adjusting a ratio of a first pressure within a first manifold mad a second pressure within a second manifold, wherein the first manifold provides a first fluid flow to the at least one primary jet vortex generator and the second manifold provides a second fluid flow to the at least one secondary jet vortex generator.

13. The method of claim 12, further comprising:
sensing, circumferential distortion across the engine inlet;
comparing the sensed circumferential distortion across the engine inlet to a desired circumferential distortion across the engine inlet; and
redistributing the ratio of the first injection rate and second injection rate when the sensed circumferential distortion across the engine inlet compares unfavorably to the desired circumferential distortion across the engine inlet.

14. A method operable to improve pressure recovery and distortion of an inlet, comprising:
providing a first fluid flow to at least one primary jet vortex generator, wherein the at least one primary jet vortex generator injects fluid at a first injection rate into a boundary layer of a primary fluid flow within the inlet;
providing a second fluid flow to at least one secondary jet vortex generator wherein the at least one secondary jet vortex generator injects inject fluid at a second injection rate into the boundary layer of the primary fluid flow within the inlet, and wherein the fluid injected at the first injection rate and second injection rate are operable to induce secondary flow structure(s) within the boundary layer; and redistributing a ratio of the first injection rate and second injection rate to improve pressure recovery and distortion of the inlet when at least one particular engine condition exists;

wherein redistributing the first injection rate and second injection rate comprises adjusting a ratio of a first pressure within a first manifold and a second pressure within a second manifold, wherein the first manifold provides the first fluid flow to the at least one primary jet vortex generator and the second manifold provides the second fluid flow to the at least one secondary jet vortex generator;

wherein redistributing the first injection rate and second injection rate is achieved dynamically and allows a desired pressure recovery to be achieved; and sensing flow conditions within the primary fluid flow, with a flow sensor system.

* * * * *